April 26, 1960
J. R. PARSONS
2,934,646
ANALYZER
Filed Dec. 10, 1954
3 Sheets-Sheet 1
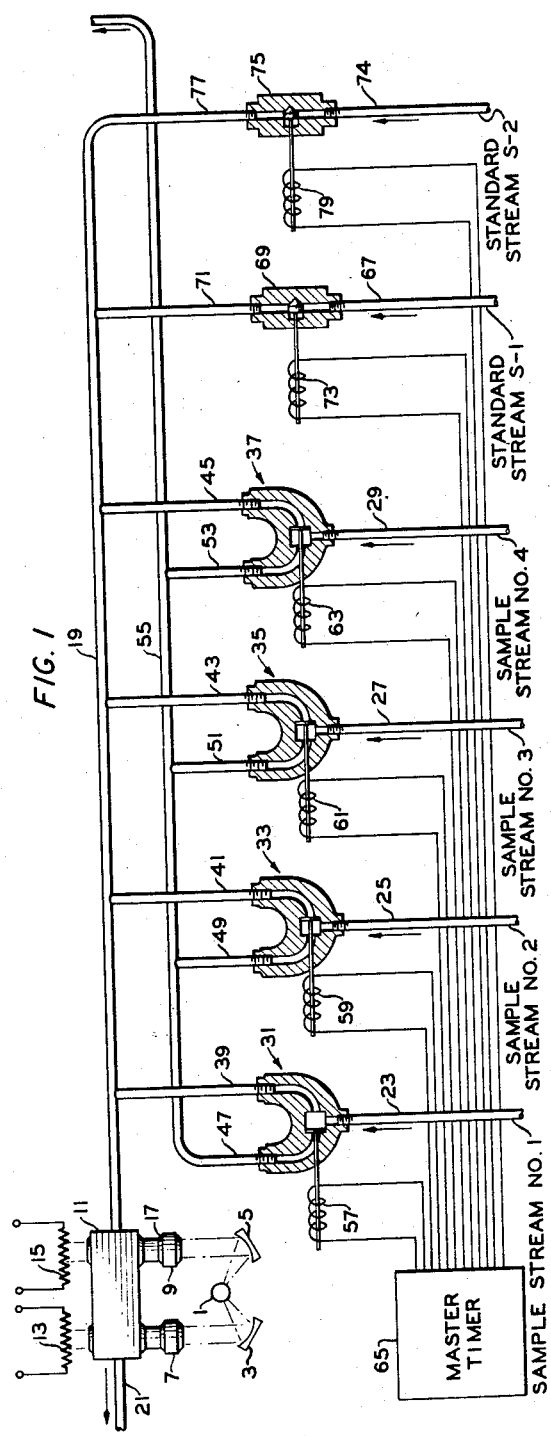
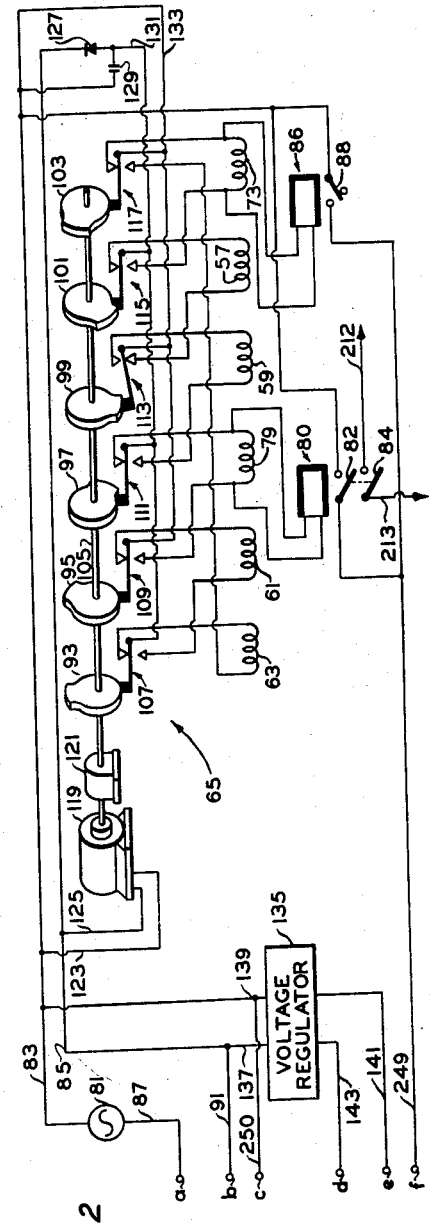
INVENTOR.
J. R. PARSONS
BY Hudson & Young
ATTORNEYS

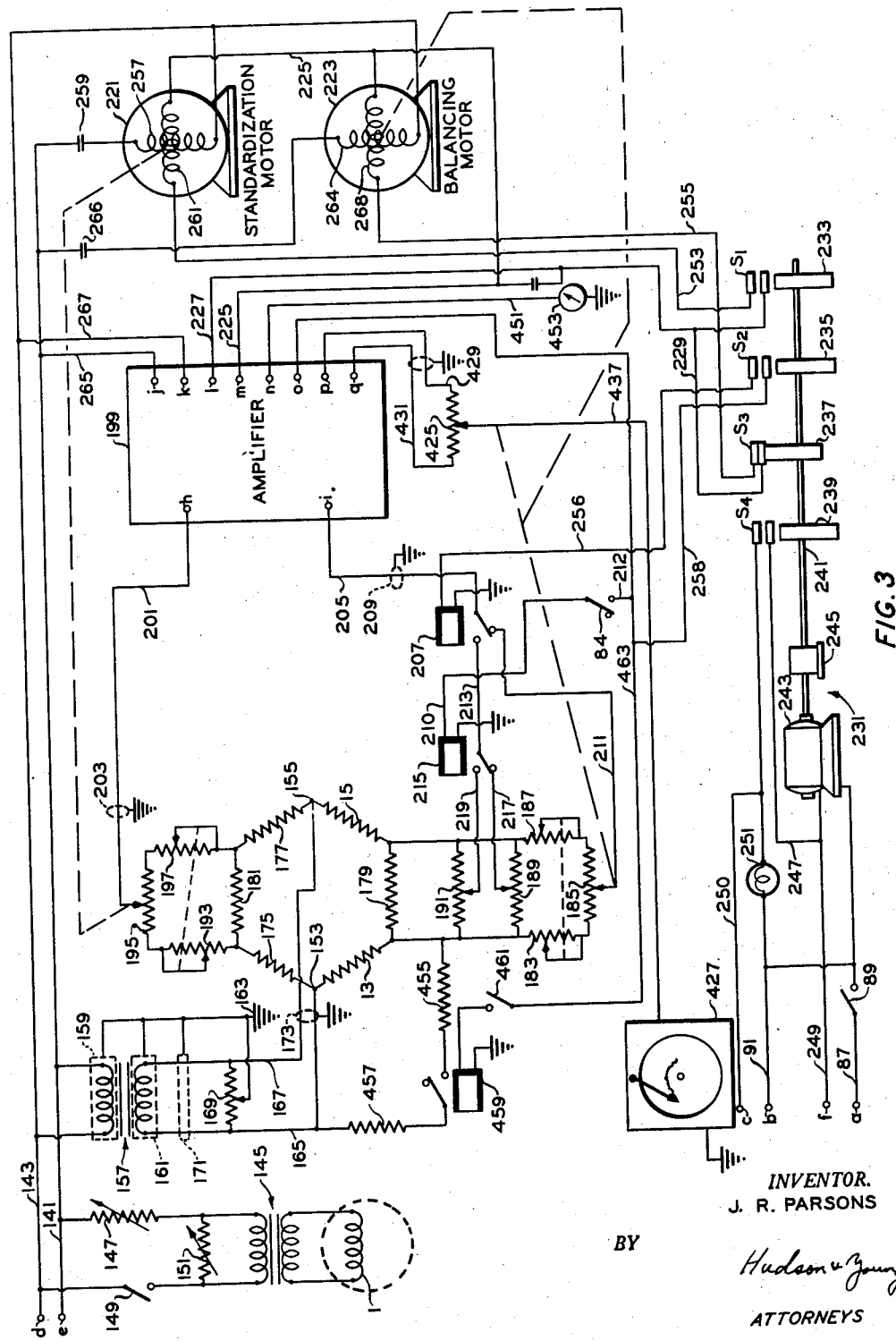

April 26, 1960

J. R. PARSONS 2,934,646

ANALYZER

Filed Dec. 10, 1954

INVENTOR.
J. R. PARSONS

BY

*Hudson & Young*

ATTORNEYS

United States Patent Office 2,934,646
Patented Apr. 26, 1960

2,934,646
ANALYZER
James R. Parsons, Bartlesville, Okla., assignor to Phillips Petroleum Company, a corporation of Delaware
Application December 10, 1954, Serial No. 474,531
3 Claims. (Cl. 250—43.5)

This invention relates to an analyzer. In one aspect, this invention relates to an infrared analyzer for measuring a radiation absorption characteristic of a plurality of fluid streams. In a more specific aspect, this invention relates to an improved system for standardizing an infrared analyzer.

Recording infrared analyzers have been devised which automatically measure the absorption of infrared radiation by various organic mixtures. Such analyzers are of particular value in the petroleum and chemical industry for recording and control purposes wherein a continuous analysis of a component of a single fluid stream or of a plurality of fluid streams is required.

Such an analyzer is described in U.S. 2,579,825 issued on December 25, 1951, to Joseph W. Hutchins, entitled "Analyzer" and in my copending application Serial No. 299,515, now Patent No. 2,833,928, filed July 17, 1952, entitled, "Analyzer." In both U.S. 2,579,825 and the copending application Serial No. 299,515, the analyzer incorporates an automatic standardization system whereby periodic adjustments are automatically made to compensate for the effect of factors causing "zero" drift in the apparatus. These factors are variations in the temperature of the ambient air, aging of circuit components and fogging of the windows through which the radiation is admitted to the sample. The automatic standardization is effective to minimize zero drift by periodically resetting the zero reading on the instrument by periodically admitting a standard reference fluid to the instrument. While such automatic standardization has constituted an important advance in the art, problems still exist with respect to the "span" of the analyzer. By "span," I mean the separation between the highest and lowest values of the calibration of the instrument, and impliedly, the capability of the instrument to continue to accurately measure and indicate sample concentrations corresponding to the most extreme values of the calibration in spite of the external effects mentioned above, i.e., ambient temperature changes, aging of circuit components and fogging of the sample cell windows. Specifically, it has been found by laboratory analyses of samples identical with those measured by the analyzer, that the accuracy of the instrument decreases at the extremes of the calibration in spite of the periodic standardization described above. In practice, the variation in span is usually a decrease in the span, although an increase in span can occur.

This problem is most acute when the analyzer is used to monitor two or more fluid streams sequentially. Frequently, the constituent in these streams for which the analyzer is sensitized varies widely from stream to stream and, thus, accurate analysis is required at the extremes of the instrument calibration.

It is an object of this invention, therefore, to provide an improved analyzer.

It is a further object of this invention to provide an improved method and apparatus for standardizing an infrared analyzer.

It is a still further object of this invention to provide a method and apparatus for automatically standardizing an analyzer so as to minimize variations in the span of the instrument due to the external effects mentioned above.

I have found that variation in the span of an analyzer is minimized by using as a standard fluid a fluid which contains an amount of the constituent for which the instrument is sensitized equal to the average amount of said constituent in the sample stream which is being monitored. I have found, further, that when a plurality of sample streams are being monitored, wherein the constituent for which the instrument is sensitized varies widely from stream to stream, minimization of variation in span is attained by using a plurality of standard fluids, each containing that amount of the constituent for which the instrument is sensitized which corresponds to the average concentration of said constituent in a group of said sample streams.

The minimization of variation in span, due to the external effects discussed above, by this invention is best illustrated by an example. Thus, an analyzer is arranged to monitor the isobutane content of a sample stream containing isobutane and normal butane. The average concentration of the isobutane in the sample stream is 50 mol percent isobutane and the sample stream concentration can be expected to vary from 40 to 60 mol percent isobutane. In accordance with the prior art, the instrument would be standardized on pure grade normal butane which corresponds to zero on the chart. The instrument then indicates and records the correct isobutane value in the sample stream until the external effects mentioned above cause the span of the instrument to vary, which usually means that the span decreases. In the event that the span decreases by 10 percent, the instrument reading is in error by 10 percent. Thus, a 50–50 sample of isobutane and normal butane is indicated and recorded as 45 mol percent isobutane and a 60–40 sample of isobutane and normal butane is indicated and recorded as 54 mol percent isobutane. However, consider the improvement when the instrument is standardized in accordance with this invention. Accordingly, the instrument is standardized on a fluid containing 50 mol percent isobutane and 50 mol percent normal butane. When the span now decreases by 10 percent, the 50–50 sample will still be read on the instrument as exactly 50 mol percent isobutane because the standardization adjusts the instrument to this value. Furthermore, in the case of a sample containing 60 mol percent isobutane and 40 mol percent normal butane, the 10 percent decrease in span causes the instrument to read 59 mol percent isobutane instead of 60 mole percent due to the 10 percent span decrease. Thus, for average conditions, i.e., a 50–50 sample, error in instrument due to a 10 percent decrease in the span is eliminated completely, while the error is reduced from six divisions to one division in the case of the 60–40 sample.

As was indicated above, my invention is advantageously applied to an instrument which is used to monitor a plurality of sample streams. In this case, the constituent for which the analyzer is sensitized frequently varies widely from stream to stream. In accordance with a preferred embodiment of this invention, the analyzer is automatically standardized on a plurality of standard streams sequentially with respect to groups of said sample streams, each standard stream containing that amount of the constituent for which the analyzer is sensitized which corresponds to the average concentration of said substituent in each group of sample streams. For example, an analyzer can be sensitized to monitor the isobutane content of a first and a second stream in which the isobutane content averages 10 and 90 mol percent, respectively. In accordance with this invention, the analyzer is first standardized against a standard fluid containing 10 mol percent isobutane, followed by an analysis is which the first stream is monitored. Passage of the first stream is then interrupted, and coincidentally therewith, the analyzer is then standardized against a standard fluid containing 90 mol per cent isobutane, followed by a period of analysis on the second stream. Three or more streams are handled in the same way, using one standardizing fluid for each group of sample fluids having amounts of the constituent for which the instrument is sensitized which can be grouped conveniently. By a "group" of sample streams, I mean a plurality of streams having more nearly the same amount of the constituent for which the analyzer is sensitized than the amount of said constituent in other sample streams not included in the group. Thus, in a preferred embodiment of my invention, the sample streams fall into two groups, one group consisting of sample streams containing up to and including 50 percent of the constiuent of interest and the other group consisting of sample streams containing more than 50 percent of the constituent of interest.

For example, in a four stream analysis, wherein streams having 10, 20, 80 and 90 percent compositions are monitored in accordance with this invention, the instrument is standardized on a 15 percent composition before analyses of the 10 and 20 percent composition streams, which constitute a first "group" of streams, and on a 85 percent composition before analyses of the 80 and 90 percent composition streams, which constitute a second "group" of streams.

An additional advantage is afforded by this invention in the case where streams of widely different compositions are monitored. For example, when streams having 10 and 90 percent compositions are monitored conventionally, the instrument must be calibrated from zero to 100 percent of the full scale on the chart. This makes for rather poor readability of the analysis of either stream. However, when such streams are monitored in accordance with this invention, the instrument is periodically automatically standardized on a 10 and 90 percent composition standard fluid. The chart is divided in half, and each sample stream, i.e., the 10 percent stream and the 90 percent stream, is made to read mid-scale on its respective half of the chart. This permits the span of the instrument to be expanded to 0 to 20 percent for 10 percent stream and 80 to 100 percent for the 90 percent stream. By spreading out the span of the instrument in this manner, readability of the instrument is greatly enhanced.

Accordingly, this invention relates to an improved method for standardizing an analyzer and an apparatus for carrying out this method. The apparatus is an improved analysis instrument employing a valve control means to pass sequentially a plurality of sample streams and standard fluids to a common sample cell of a single infrared analyzer and means are provided for rebalancing in an automatic manner the electrical bridge in response to admission of the standard fluids to the sample cell to compensate for variations in ambient temperature and other factors likely to cause error. Also, the instrument can be adjusted manually during each standardization cycle to bring the standardization reading to the preselected value. The analyzer employed is a double beam instrument wherein two beams strike respective radiation sensitive elements forming arms of a balanced electrical circuit, such as an alternating current Wheatstone bridge. Any electrical unbalance of the bridge due to differences in intensity of radiation striking the arms is amplified and applied to motor-driven means which adjust balancing impedances in the bridge circuit to restore a balanced condition.

Various other objects, advantages and features of this invention will become apparent from the following detailed description taken in conjunction with the accompanying drawings in which:

Figure 1 is a schematic view of the valve system for passing a plurality of fluid streams to the analyzer;

Figure 2 is a schematic view of the valve control timing system;

Figure 3 is a schematic view of the infrared analyzer and recorder; and

Figure 4:
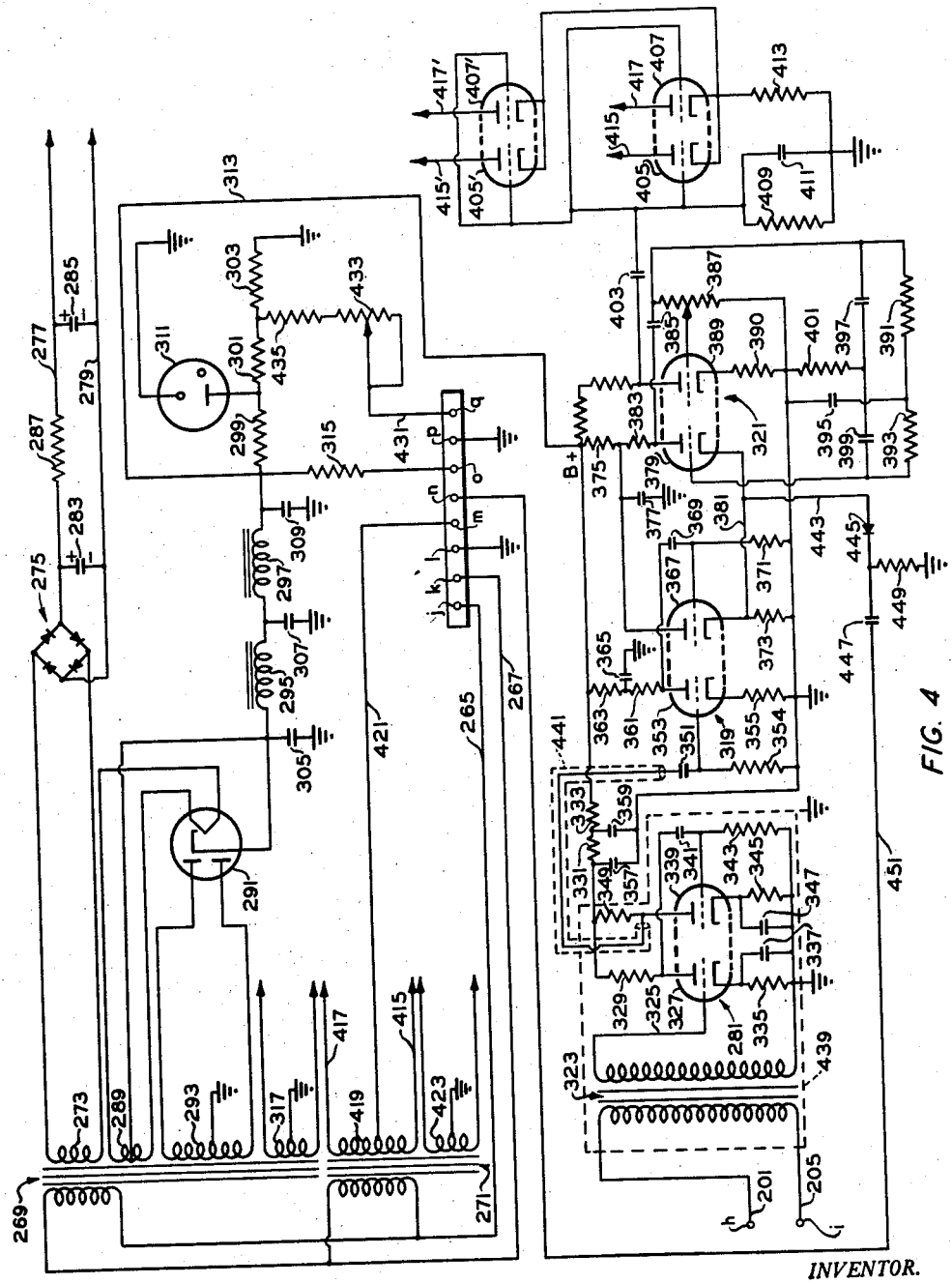
Figure 4 is a schematic circuit diagram of the amplifier employed in Figure 3.

Referring now to Figure 1, there is shown a source 1 of infrared or other suitable radiation from which two beams are directed against a pair of concave reflectors 3 and 5. From reflectors 3 and 5, the respective radiation beams are reflected and passed through a pair of cells 7 and 9 and through a common cell 11 to a pair of radiation sensitive elements 13 and 15, such as bolometers, thermistors, and the like. The various cells are provided with windows 17 which are transparent to the radiation employed. In the case of infrared radiation, windows 17 can be formed of a halide such as silver chloride, calcium fluoride, sodium fluoride or from quartz. Cell 7, which can be formed from Pyrex glass, spinel or quartz, preferably is filled with a pure material or mixture of materials having a principal absorption band at the same wavelength as the principal absorption band of the material or component to be measured in the sample stream, while like constructed cell 9 contains air or other substances transparent to the radiation; or, cell 9 can contain a gas whose absorption bands are such as to reduce interference from other components. The fluid under test is admitted to sample cell 11 by a conduit 19 and leaves the cell through a conduit 21.

The beams of radiation incident to elements 13 and 15 produce temperature changes which in turn vary the electrical resistance of these elements. With the apparatus arranged as illustrated, any differential in resistance between elements 13 and 15 is indicative of the amount or percentage of the desired pure material or component in the mixture passing through the sample cell, provided this pure material or component has a principal absorption band at the same wave length as the fluid in cell 7. The apparatus for producing an impedance differential between elements 13 and 15, which differential is proportional to the percentage of the component under test, is well known in the art and forms no part of the present invention. Furthermore, other types of radiation such as monochromatic light or ultraviolet radiation can be employed in like manner so long as the impedance change is produced in the radiation sensitive elements by variations in the composition of the sample fluid.

For purposes of illustration it will be assumed that the analyzer is to be employed to measure sequentially the percentage of a given component in four sample streams. These are designated as sample streams No. 1, 2, 3 and 4 and enter the analyzer system through respective inlet conduits 23, 25, 27 and 29. Conduits 23, 25, 27 and 29 communicate with the inlets of respective solenoid operated valves 31, 33, 35 and 37. Valves 31, 33, 35 and 37 are provided with respective first outlet conduits 39, 41, 43 and 45 which communicate with sample cell inlet conduit 19, and with respective second outlet conduits 47, 49, 51 and 53. These latter conduits communicate with a common conduit 55 for venting those sample streams which are not being passed to sample cell 11 at any given time. Valves 31, 33, 35 and 37 are actuated by solenoid coils 57, 59, 61 and 63, respectively, which in turn are energized through a master time 65, which is illustrated in detail in Figure 2. Valves 31, 33, 35 and 37 are biased so that, in the absence of energizing current being applied through coils 57, 59, 61 and 63, inlet conduits 23, 25, 27 and 29 communicate directly with respective venting outlet conduits 47, 49, 51 and 53. The application of energizing current to the solenoid coil associated with any one of valves 31, 33, 35 and 37 serves to actuate that particular valve so that the inlet fluid stream applied thereto passes directly into conduit 19 instead of conduit 55. As illustrated, energizing current is being applied to solenoid coil 57 to pass sample stream No. 1 into cell 11, the remaining sample streams 2–4 being passed to venting conduit 55.

In order to compensate for factors such as temperature changes and aging of the circuit components, means are provided for automatically standardizing the apparatus periodically against a pair of standardizing fluids, S–1 and S–2. To this end, standard stream S–1 is admitted to the analyzer unit through an inlet conduit 67, conduit 67 communicating through a solenoid operated valve 69 with a conduit 71, which in turn is connected to common inlet conduit 19 of cell 11. Valve 69 is actuated by a solenoid coil 73, which also is energized through master time 65. Valve 69 normally remains closed, but is opened periodically to pass standard stream S–1 into cell 11. The second standard stream S–2 is admitted to the analyzer unit through an inlet conduit 74. Conduit 74 communicates through a solenoid operated valve 75 with a conduit 77, which in turn is connected to common inlet conduit 19 of cell 11. Valve 75 is actuated by a solenoid coil 79, which also is energized through master timer 65. Valve 75 also remains closed, normally, but is opened periodically to pass standard stream S–2 into cell 11.

Master timer 65 is illustrated in greater detail in Figure 2. This timer, as well as the entire analyzer, is energized from a source 81 of alternating voltage having one terminal connected to a lead 83 and the other terminal connected to a lead 85 through a lead 87, terminal *a*, switch 89 (see Figure 3), terminal *b* and lead 91. Terminal *a* and the other terminals designated by small letters are provided throughout the drawing to illustrate interconnection between the various figures.

Referring to Figure 2, master timer 65 comprises 6 cams, 93, 95, 97, 99, 101 and 103 mounted for rotation about a common shaft 105. The cams sequentially engage respective contact arms of switches 107, 109, 111, 113, 115 and 117 which can be of the type disclosed in U.S. Patent No. 1,960,020, to supply energized current to associated solenoid coils 61, 79, 59, 57, 73 and 63. Cam shaft 105 is rotated by a motor 119 connected thereto through a reduction gear 121. Motor 119 is connected across voltage leads 83 and 85 by leads 123 and 125, respectively.

A source of direct current voltage for energizing solenoid coils 57, 59, 61, 63, 73 and 79 is provided by a rectifier 127 having one terminal connected to lead 85 and the other terminal connected through a condenser 129 to lead 83. A lead 131 connected to the junction between rectifier 127 and condenser 129, is applied to the contact arms of switches 115, 111 and 107. The contact arms of switches 117, 113 and 109 are connected to a lead 133 which is connected to voltage lead 83. First end terminals of solenoid coils 73, 57, 59, 79, 61 and 63 are connected to lower contacts of respective switches 115, 113, 111, 109, 107 and 117 so that said first end terminals are in contact with the respective contact arms of said switches as the raised portion of the respective cams carried on shaft 105 are in contact therewith. The second end terminals of solenoid coils 73, 57, 59, 79, 61 and 63 are connected to upper contacts of respective switches 117, 115, 113, 111, 109 and 107 so that said second end terminals are in contact with the respective contact arms of said switches at such times as the raised portions of the respective cams are not in contact therewith.

The raised portions of cams 93, 95, 97, 99, 101 and 103 are constructed so that the raised portion of each cam engages its respective contact arm approximately 1/90 revolution before the preceding cam raised portion disengages its contact arm. This "cocking" action insures that at least one solenoid coil is energized at all times.

A voltage regulator 135 is employed to provide a regulated voltage for energizing the electrical circuit of the analysis unit. The input terminals of voltage regulator 135 are connected to source 81 by leads 137 and 139, and the output regulated voltage is applied across leads 141 and 143.

Referring now to Figure 3, radiation source 1 is illustrated as being connected across the secondary winding of a transformer 145. The primary winding of transformer 145 is connected across leads 141 and 143 through a ballast resistor 147 and a switch 149. A variable resistor 151 is connected in shunt with the primary winding of transformer 145. Thus, a constant voltage is maintained across source 1.

The regulated voltage between leads 141 and 143 also is connected across opposite terminals 153 and 155 of the Wheatstone bridge circuit through a transformer 157. Both the primary and secondary windings of transformer 157 are provided with shields 159 and 161, respectively, which are connected to a ground terminal 163. The secondary winding of transformer 157 is connected by leads 165 and 167 to terminals 153 and 155 of the bridge circuit. A potentiometer 169 has its end terminals connected to leads 165 and 167 and the contactor of potentiometer 169 is also connected to ground terminal 163. Leads 165 and 167 are provided with grounded shields 171 and 173.

Radiation sensitive elements 13 and 15 are connected in a Wheatstone bridge circuit with balancing resistors 175 and 177 so that voltage terminal 153 is between element 13 and resistor 175 and voltage terminal 155 is between element 15 and resistor 177. A resistor 179 is connected between elements 13 and 15 and a resistor 181 is connected between resistors 175 and 177. Resistor 179 is shunted by a unit including a variable resistor 183, a potentiometer 185 and a variable resistor 187, all connected in series. A pair of potentiometers 189 and 191 each have one end terminal connected to a junction between elements 179 and 183 and the other end terminal thereof connected to a junction between resistors 179 and 187. Resistor 181 is shunted by a unit including a variable resistor 193, potentiometer 195 and a variable resistor 197, all connected in series.

When alternating potential is applied across terminals 153 and 155 of the bridge circuit, potentiometers 185 and 195 can be adjusted so that there is a zero potential difference therebetween; and, similarly each of potentiometers 189 and 191 can be adjusted with respect to potentiometer 195 so that there is a zero potential therebetween. The bridge then is balanced so far as the contact arms of these potentiometers are concerned.

Variable resistors 193 and 197 are connected to a common control shaftt so that rotation of the shaft increases the ohmic value of one of these resistors and decreases the ohmic value of the other. Thus, ganged resistors 193 and 197 can be used as an auxiliary bridge balance control because rotation of the shaft increases the resistance on one side of potentiometer 195 and decreases the resistance on the other side of potentiometer 195. Variable resistors 183 and 187 also are connected to a common control shaft. Adjustment of this latter shaft, however, either increases or decreases the ohmic value of both resistors simultaneously, thereby affording adjustment of the sensitivity of the bridge circuit. For example, when the resistance of units 183 and 187 is high, full scale movement of potentiometer 185 produces only a small variation in the balance point of the bridge due to the relatively large series resistances in circuit therewith. When the resistance of units 183 and 187 is small, adjustment of potentiometer 185 covers a wide range of balancing conditions because the series resistance in circuit therewith is small.

The contactor of potentiometer 195 is connected to one input terminal *h* of an amplifier 199 by means of a lead 201, the latter being enclosed in a grounded shield 203. The other input terminal *i* of amplifier 199 is connected by a lead 205 to the armature of a relay 207. Lead 205 is enclosed in a grounded shield 209. In the absence of energizing current passing through the coil of relay 207, the armature of relay 207 makes contact with a lead 211 which connects the contactor of potentiometer 185 to amplifier input lead 205. When energizing current is passed through the coil of relay 207, the armature of relay 207 makes contact with a lead 213 which is connected to the armature of a relay 215. In the absence of energizing current passing through the coil of relay 215, the armature of relay 215 makes contact with a lead 217 which connects with the contactor of potentiometer 189.

When energizing current is passed through the coil of relay 215, the armature of relay 215 makes contact with lead 219 which connects with the contactor of potentiometer 191. One end terminal of the coil of relay 215 is grounded and the second end terminal of the coil of relay 215 is connected by a lead 210, switch 84, actuated as thereinafter described, and a lead 212 to a lead 463 and the voltage terminal $o$ of amplifier 199.

The output signal from amplifier 199 selectively energizes a pair of motors 221 and 223, the output rotations of which are coupled mechanically to the respective contactors of potentiometers 195 and 185. To this end, one output terminal $m$ of amplifier 199 is connected by a lead 225 to one terminal of each of said motors 221 and 223, and a second output terminal $l$ is connected by leads 227 and 229 to lower terminals of respective contact sets $S_1$ and $S_3$ of a sequence timer cam-operated switch 231.

Switch 231 includes four contact sets $S_1$, $S_2$, $S_3$ and $S_4$ actuated by respective cams 233, 235, 237 and 239. These cams are mounted on a common shaft 241 which is rotated by a motor 243 connected thereto through a reduction gearing 245.

Motor 243 is energized by voltage source 81 (Figure 2) through lead 87 and through lead 83, switch 82 or switch 88, terminal $f$ and a lead 249. Such energization of motor 243 causes it to rotate shaft 241 to close switches $S_1$, $S_2$ and $S_4$ and open switch $S_3$. When switch $S_4$ closes, motor 243 continues to be energized after switch 82 or switch 88 opens through lead 87 and lead 139, a lead 250, terminal $c$, switch $S_4$ and lead 247. A pilot light 251 is connected between terminal $b$ and lead 250.

The upper terminal of contact set $S_1$ is connected to a terminal of motor 221 by a lead 253 and the upper terminal of contact set $S_3$ is connected to a terminal of motor 223 by a lead 255. The terminals of contact set $S_2$ are connected respectively, to one end terminal of the coil of relay 207 by a lead 256 and to the output terminal $o$ of amplifier 199 by leads 258 and 463, respectively.

The master timer 65, as shown in detail in Figure 2, operates to selectively energize timer switch 231 and to selectively energize relays 207 and 215 in the following manner. A relay 80 (Figure 2) having two switches 82 and 84 is connected across the end terminals of coil 79 and a relay 86 having a switch 88 is connected across the end terminals of coil 73. When either coil 79 or 73 is energized by master timer 65, switch 82 or switch 88 is closed, which supplies power through lead 249 and terminal $f$ to one terminal of motor 243 (Figure 3), the other terminal of motor 243 being connected to power through switch 89 and lead 87. The resultant operation of motor 243 causes switch $S_4$ to be closed, thus "locking" motor 243 to the power supply.

In the case where timer 65 energizes coil 73, relay 86 is energized, switch 88 is closed and standard stream S-1 is admitted to the cell 11. Operation of motor 243 causes switches $S_1$, $S_2$ and $S_4$ to be closed and switch $S_3$ to open. When switch $S_2$ is closed, relay 207 is energized and potentiometer 189 is thereby connected to the input terminal $i$ of amplifier 199 through lead 217, lead 213 and lead 205. Since switch $S_1$ is also closed, motor 221 is connected to the output of amplifier 199 and motor 221 moves potentiometer 195 to a balanced condition. In the event that the instrument does not read exactly upon the standardization value for standard stream S-1 under these conditions, due to aging of circuit components, etc., potentiometer 189 is manually adjusted so that potentiometer 195 is moved by motor 221 to the preselected position on the scale of the instrument corresponding to the composition of standard stream S-1.

When master timer 65 energizes coil 79, relay 80 is energized which closes switches 82 and 84. When switch 82 is closed, motor 243 is actuated to close switches $S_1$, $S_2$, and $S_4$, and open switch $S_3$ as previously described. The closing of switch $S_2$ again energizes relay 207 and the armature of relay 207 closes to connect lead 213 to lead 205 and the input terminal $i$ of the amplifier. However, since energization of relay 80 also causes switch 84 to close, relay 215 is energized and, thereupon, the armature of relay 215 closes to connect lead 213 to lead 219 and the contactor of potentiometer 191. Again, motor 221 moves potentiometer 195 to balanced position. In the event that the instrument fails to read exactly upon the standardization value for standard stream S-2, potentiometer 191 is manually adjusted so that the contactor of potentiometer 195 is moved by motor 221 to the second preselected position on the scale of the instrument corresponding to the composition of standard stream S-2.

Both of motors 221 and 223 are 2-phase induction motors. Motor 221 is provided with a first winding 257 connected across power leads 141 and 143 in series with a condenser 259 and with a second winding 261 connected across leads 225 and 227 via switch $S_1$. Motor 223 is provided with a first winding 264 connected across power leads 141 and 143 in series with a condenser 266 and a second winding 268 connected across leads 225 and 227 via switch $S_3$.

When contact set $S_1$ is closed, the output of amplifier 199 is applied to motor 221 and when contact set $S_3$ is closed the output of amplifier 199 is applied to motor 223. As will be described more completely hereinafter, the output of amplifier 199 is such that motors 221 and 223 are rotated in one direction when the signal from the bridge indicates an unbalance in one direction and are rotated in the opposite direction when the bridge is unbalanced in the opposite manner.

Amplifier 199 and the power supply circuit associated therewith is illustrated in detail in Figure 4. The alternating voltage from regulator 135 (Figure 2) is applied by leads 141 and 143 (Figure 2), terminals $j$ and $k$ of amplifier 199 and leads 265 and 267 to the primary windings of transformers 269 and 271. A secondary winding 273 of transformer 269 is connected across opposite terminals of a full wave rectifier bridge 275. A pair of leads 277 and 279 are connected across the remaining pair of opposite terminals of bridge 275 to deliver a source of direct voltage to heaters, not shown, of a double triode tube 281 in amplifier 199. A pair of filter condensers 283 and 285 are connected between leads 277 and 279 and a resistor 287 is connected in series with lead 277.

The end terminals of a secondary winding 289 of transformer 269 are applied to the filament heater of a double rectifier tube 291 which functions as a full wave rectifier, and the center tap of winding 289 is connected to the common cathode of rectifier 291. The end terminals of a secondary winding 293 of transformer 269 are connected to the respective anodes of double rectifier tube 291, and the center tap of winding 293 is grounded. Tube 291 thus functions as a full wave rectifier, the common cathode of which is connected to ground through series connected filter inductors 295, 297 and resistors 299, 301, and 303. A first filter condenser 305 is connected between the cathode of tube 291 and ground; a second filter condenser 307 is connected between the junction of inductors 295, 297 and ground; and a third filter condenser 309 is connected between ground and the common junction of inductor 297 and resistor 299. A voltage regulating diode 311 has its anode connected to the junction between resistors 299 and 301 and its cathode connected to ground. The positive potential appearing at the junction between inductor 297 and resistor 299 is applied by a lead 313 to form the B+ voltage supply of amplifier 199. The junction between inductor 297 and resistor 299 also is connected to terminal o through a resistor 315.

A fourth secondary winding 317 of transformer 269, having its center terminal grounded, supplies heater current to the filaments of double triodes 319 and 321 of amplifier 199.

The input signal to amplifier 199 is applied across the end terminals of the primary winding of a transformer 323. One end therminal of the secondary winding of transformer 323 is connected to ground and the second end terminal of the secondary winding of transformer 323 is connected by a lead 325 to the control grid of a triode vacuum tube 327. The anode of tube 327 is connected through series resistors 329, 331 and 333 to the B+ voltage terminal. The cathode of tube 327 is connected to ground through a resistor 335 having a condenser 337 connected in shunt therewith. The anode of tube 327 also is connected to the control grid of a triode vacuum tube 339 through a condenser 341.

The control grid of tube 339 is connected to ground through a resistor 343 and the cathode of tube 339 is connected to ground through a resistor 345, the latter resistor having a condenser 337 connected in shunt therewith. The anode of tube 339 is connected through series resistors 349, 331 and 333 to the B+ voltage terminal and also, through a condenser 351 to the control grid of a triode vacuum tube 353. The control grid of tube 353 is connected to ground through a resistance 354.

The cathode of tube 353 is connected to ground through a resistor 355. A condenser 357 is connected between the junction of resistors 349, 331 and ground and a condenser 359 is connected between the junction of resistors 331, 333 and ground. The anode of tube 353 is connected to the B+ voltage terminal through series resistors 361 and 363. The junction between resistors 361 and 363 is connected to ground through a condenser 365. The anode of tube 353 is also connected to the control grid of a triode vacuum tube 367 through a condenser 369.

The control grid of tube 367 is connected to ground through a resistor 371 and the cathode of tube 367 is connected to ground through a resistor 373. The anode of tube 367 is connected to the B+ voltage terminal through a resistor 375 and to ground through a condenser 377.

The cathode of tube 367 is connected directly to the cathode of a triode vacuum tube 379 by a lead 381. The anode of tube 379 is connected to the B+ voltage terminal through series resistors 383 and 375. The anode of tube 379 is also connected through a condenser 385 to the first end terminal of a gain regulating potentiometer 387, the second end terminal of which is grounded. The contactor of potentiometer 387 is connected to the control grid of a triode vacuum tube 389. The junction between condenser 385 and the first end terminal of potentiometer 387 is connected to the control grid of tube 379 through a parallel-T filter. The cathode of tube 389 is connected to ground through a resistor 390.

The first path of the parallel-T filter comprises series resistors 391 and 393, the junction therebetween being grounded through a condenser 395. The second path of the parallel-T filter comprises series condensers 397 and 399, the junction therebetween being grounded through a resistor 401.

The anode of tube 389, which tube forms the last stage of amplifier 199, is connected through a condenser 403 to the control grids of triode vacuum tubes 405 and 407. The control grids of tubes 407 and 405 are connected to one another and to ground through a resistor 409 having a condenser 411 connected in shunt therewith. The cathodes of tubes 405 and 407 are connected to one another and to ground through common resistor 413. The anodes of tubes 405 and 407 are connected by respective leads 415 and 417 to opposite end terminals of a first secondary winding 419 of transformer 271. The center tap of secondary winding 419 is connected by a lead 421 to second windings 261 and 268 of motors 221 and 223 through terminal m, as hereinbefore described.

If desired, a second pair of triode vacuum tubes 405' and 407' can be connected in parallel relationship with respective tubes 405 and 407. The control grids of tubes 405' and 407' are connected to one another and to the interconnected control grids of tubes 405 and 407. The cathodes of tubes 405' and 407' are connected to the cathodes of tubes 405 and 407 in like manner. The anodes of tubes 405' and 407' similarly are connected to the respective end terminals of transformer winding 419 by leads 415' and 417'. The source of heater current for tubes 405, 407, 405' and 407' is supplied by a secondary winding 423 of transformer 271.

A telemetering potentiometer 425, Figure 3, is provided to transmit an electrical signal to a recorder 427 which is indicative of the composition of the sample stream under analysis. One end terminal of potentiometer 425 is connected by a lead 429 to ground (terminal p) and the second end terminal of potentiometer 425 is connected by a lead 431 through terminal q, variable resistor 433 and resistor 435 (Figure 4), to a point of positive potential at the junction of resistors 301 and 303. The contactor of potentiometer 425 is connected to recorder 427 by a lead 437 and also is mechanically coupled to the output rotation of motor 223, Figure 3.

Amplifier 199 is particularly adapted to amplify the unbalance voltage from the bridge circuit to drive motors 221 and 223. To minimize the effects of extraneous electrical signals, grounded electrostatic shields 159 and 161 (Figure 3) enclose the respective windings of transformer 157, grounded shields 171 and 173 enclose leads 165 and 167, and grounded shields 203 and 209 enclose respective leads 201 and 205. Transformer 323 and tubes 327 and 339 (Figure 4) are enclosed in a magnetic shield 439, and the lead connecting the anode of tube 339 to the control grid of tube 353 is enclosed in a shield 441. The filament heaters of tubes 327 and 339 are supplied by direct current from leads 277 and 279. To reduce the effects of stray capacitance and leakage resistance, a potentiometer 169, (Figure 3) having its contactor grounded, is connected in parallel across the secondary winding of transformer 157. The resistance of potentiometer 169 can be of the order of 250 ohms, for example. A lead 443 (Figure 4) is connected to the cathode of tube 367 and to one terminal of a rectifier 445, the second terminal of which is connected to one plate of a condenser 447 and, also, grounded through a resistor 449. The second plate of condenser 447 is connected by lead 451 through terminal n to one terminal of a sensitive current meter 453 (Figure 3), the second terminal of which is grounded.

In operation, the bridge is first balanced as well as possible by motor 223. The contactor of potentiometer 169 then is adjusted manually until meter 453 indicates minimum current flow therethrough. This places the input terminals h and i of amplifier 199 at ground potential so that any capacitance between the contactor of potentiometer 195 and ground and between the contactor of potentiometer 185 and ground has no effect because there is no potential difference between these points and ground. Increased sensitivity is obtained in this measurement by amplifying the stray capacitance unbalance before indication on meter 453.

The parallel-T filter (Figure 4) disposed between the anode of tube 379 and the control grid thereof is adapted to minimize the transmission through the amplifier of stray voltages of frequencies other than 60 cycles. This filter is tuned to 60 cycles and, as such, presents high impedance to 60 cycle signals and relatively low impedance to other signals. Accordingly, at frequencies other than 60 cycles which the amplifier would normally pass, the parallel-T network provides some transmission to apply degenerative feedback to the grid of tube 379. Representative values of the circuit components which will provide such transmission of only the 60 cycle signal are as follows: condensers 397 and 399, each 0.01 microfarad; condenser 395, 0.02 microfarad; resistors 391 and 393, 265,000 ohms; and resistor 401, 132,500 ohms.

The output stage of amplifier 199 comprises parallel tubes 405 and 407, the anodes of which are connected to respective end terminals of transformer winding 419. The center tap of winding 419 is grounded through coils 261 and 268 of respective motors 221 and 223. Because the anode of one of tubes 405, 407 is positive while the other is negative, each tube conducts during alternating half cycles of applied voltage. In the absence of a signal on the control grids the output of these two tubes consists of two pulses per cycle, so that, if the two pulses are equal, there is no 60 cycle component in the output. However, if a 60 cycle signal, either in phase or 180° out of phase with the operating voltage, is applied to the control grids of tubes 405 and 407, one of the output pulses is increased and the other decreased, thereby providing a 60 cycle component in the output. By providing tubes 405′ and 407′ in parallel with tubes 405 and 407, a safety factor is established should one of the tubes fail. Condensers 259 and 266 in series with respective motor windings 257 and 264 shift the current vector 90° in relation to the current in the amplifier output windings 261 and 268, thus providing a rotating magnetic field to drive the motors.

In order to provide a simple determination of proper operation of the electrical circuit components, a pair of resistors 455 and 457 (Figure 3) are connected in parallel across element 13 through the armature of a relay 459. Normally, the contact through relay 459 is open so that resistors 455 and 457 are out of the bridge circuit. One terminal of the coil of relay 459 is grounded and the other connected to voltage terminal $o$ through a switch 461 and a lead 463. Closure of switch 461 actuates relay 459 to connect series resistors 455 and 457 in parallel with element 13, thereby establishing a deflection on recorder 427 of preselected magnitude if the circuit is operating in the proper manner. Typical values of these components can be as follows: element 13, 1500 ohms and resistors 455 and 457, 10 megohms each.

In order to adjust the analyzer initially, cam switch 115 first is moved to energize solenoid coil 73 and the coil of relay 86 connected in parallel with solenoid coil 73. Thereupon, standard stream S-1 from inlet conduit 67 flows through conduits 71 and 19 to sample cell 11. During this period the remaining valves 31, 33, 35, 37 and 75 are in their normally closed position so that sample streams 1-4 are vented through conduit 55. When relay 86 is energized, switch 88 is closed which causes motor 243 to be energized through lead 249 and terminal $f$. Motor 243 rotates shaft 241 to close switches $S_1$, $S_2$ and $S_4$ and open switch $S_3$. The opening of switch $S_3$ disconnects balancing motor 223 from the amplifier output and the closing of switch $S_1$ connects standardization motor 221 to the amplifier output. Motor 221 then drives the contactor of potentiometer 195 to a position on the scale which corresponds to the composition of standard stream S-1. This sequence of operations occurs whenever standard stream S-1 is admitted to cell 11. As the instrument is used over a period of time, aging of circuit components and other factors cause the span of the instrument to vary and the observed result is that the contactor of potentiometer 195 fails to return to the same position on the scale as it did when standard stream S-1 was first admitted to cell 11. This variation in span is corrected, in accordance with this invention, by using as a standard fluid a fluid which contains an amount of the constituent for which the instrument is sensitized equal to the average amount of said constituent in the sample stream to be analyzed.

The first sample stream then is passed into cell 11 of the analyzer unit by rotation of shaft 105 until the raised portion of cam 99 engages the contact arm of switch 113, as is shown in Figure 2. If the percentage of the component of interest is different in this first sample stream than in the standardizing sample, the impedance of elements 13 and 15 will be changed with resultant unbalance of the bridge circuit. As has been explained heretofore, contact sets $S_1$, $S_2$ and $S_4$ are open during actual on-stream analysis and the contact set $S_3$ is closed. The unbalance voltage appearing between the arms of the potentiometers 185 and 195 is fed to amplifier 199 so that motor 223 moves potentiometer 185 to restore the bridge to a balanced position. The movement of the arm of potentiometer 185 necessary to balance the bridge is an indication of the percentage variation of the component under test from that in the standardizing sample. This variation is measured by movement of the contactor of telemetering potentiometer 425, and a voltage proportional thereto is applied to recorder 427. It should be understood that this electrical signal applied to recorder 427 can actuate control equipment in a manner well understood by those skilled in the art to change an appropriate process variable, thereby restoring the composition of the process sample to a desired value.

During subsequent operation of the instrument, master timer 65 causes standard stream S-2 to be admitted to cell 11 and, coincidentally therewith, energizes relay 80. The energization of relay 80 causes switches 82 and 84 to be closed. The closing of switch 82 again energizes motor 243 through lead 249 and terminal $f$. The energization of motor 243 causes switches $S_1$, $S_2$ and $S_4$ to be closed and switch $S_3$ to be opened as described hereinbefore. Motor 221 then drives the contactor of potentiometer 195 to a position on the scale which corresponds to the composition of standard stream S-2. In the event that aging of circuit components or other factors have caused the span of the instrument to vary, the instrument is adjusted, in accordance with this invention, by using as a standard fluid a fluid which contains an amount of the constituent for which the instrument is sensitized equal to the average amount of said constituent in the sample stream to be analyzed.

The standardizing streams from inlet conduits 67 and 74 are periodically fed to cell 11. Where a plurality of sample streams are being analyzed and wherein the percentage composition of the component of interest in the sample streams falls in groups of related percentage composition, a standard stream is fed to the cell 11 of the instrument between sample streams of each group so that the instrument is standardized periodically against a standard stream having a composition corresponding to the average composition of the sample streams in each group. Accordingly, the setting of potentiometer 195 is adjusted by motor 221 to compensate for resistance variations due to temperature changes, aging of the circuit components and other factors. When a standardizing stream is fed to cell 11 in this manner, the input terminals of amplifier 199 are connected to the arms of potentiometer 195 and either potentiometer 189 or potentiometer 191, and the output terminals of amplifier 199 are connected to motor 221. Normally, the bridge should be balanced during this time because such was the original condition for which a balance was obtained. However, should the bridge be unbalanced for any reason, the unbalanced voltage is fed through amplifier 199 with the result that motor 221 moves potentiometer 195 to restore the bridge to a balanced condition. Thereupon the amplifier input terminals are once again connected to the arms of potentiometers 195 and 185 and the next sample stream is admitted to cell 11. The output of amplifier 199 is then connected to motor 223 and additional determinations of the composition of the process streams are realized.

From the foregoing description, it should be apparent that there is provided in accordance with this invention an analyzer adapted to measure sequentially the composition of a plurality of sample streams. In accordance with this invention, the analyzer is standardized with a plurality of standardizing streams, the composition of the standardizing streams being selected so as to correspond with the composition of the sample streams under analyses. Thus, variation in the span of the instrument fails to produce as great an error in the instrument reading as is the case in analyzers of the prior art wherein only a standardizing stream corresponding to zero on the chart was used. While this invention has been described in conjunction with a present preferred embodiment it should be apparent that various modifications can be made by those skilled in the art without departing from the scope of this invention. It is pointed out, in particular, that as many sample streams and as many standardizing streams as are desired can be utilized in accordance with this invention and the advantages thereof will be realized.

I claim:

1. A system for analyzing sequentially a plurality of fluid streams comprising, in combination, a sample cell, first and second radiation sensitive resistance elements, a source of radiation, means for directing a pair of beams of radiation from said source through said cell to impinge upon respective ones of said resistance elements, a filter disposed in one of said beams, a plurality of solenoid operated sample valves for passing individual sample streams to said sample cell, a plurality of solenoid operated standard valves for passing individual standard streams to said sample cell, a cam operated switching means for actuating said solenoids in a preselected sequence, a balancing resistor connected to one terminal of each of said radiation sensitive resistance elements, a first resistance interconnecting the other terminals of said radiation sensitive resistance elements, a second resistance interconnecting said balancing resistors to form a Wheatstone bridge circuit, a unit shunted across said second resistance including a variable resistor, a first motor-driven potentiometer, and a second variable resistance all connected in series, a unit shunted across said first resistance including a third variable resistance, a second motor-driven potentiometer and a fourth variable resistance all connected in series, a plurality of manually adjustable potentiometers connected in shunt with said second motor-driven potentiometer, the number of said manually adjustable potentiometers being equal to the number of said solenoid operated standard valves, an amplifier, a lead connecting one input terminal of said amplifier to the arm of said first motor-driven potentiometer, a first switching means for selectively connecting the other input terminal of said amplifier to said second motor-driven potentiometer or to one of said plurality of manually adjustable potentiometers, and a second switching means for actuating said first switching means so as to connect one of said manually adjustable potentiometers to said amplifier input terminal coincidentally with the actuation of one of said solenoid operated standard valves by said cam operated switching means.

2. A system for analyzing sequentially a plurality of fluid sample streams for one of their constituents and for standardizing said system against a plurality of fluid standardization streams which comprises, in combination, a sample cell, a Wheatstone bridge circuit, a pair of radiation sensitive devices disposed, respectively, in two arms of said bridge, the impedance of said devices being proportional to the intensity of radiation incident thereon, a standardization potentiometer and a balancing potentiometer included in said bridge circuit, a plurality of solenoid operated sample valves for admitting said sample streams to said sample cell, a plurality of solenoid operated standardization valves for admitting said standardization streams to said sample cell, a first motor-driven cam operated switching means for energizing said solenoid operated sample valves and said solenoid operated standardization valves in a preselected sequence, a plurality of manually adjustable potentiometers connected in parallel circuit with said balancing potentiometer, the number of said manually adjustable potentiometers being equal to the number of said standardization streams, an amplifier having a pair of input terminals and producing an output, the contactor of said standardization potentiometer being connected to one of said amplifier input terminals and the contactor of said balancing potentiometer being connected to the other of said amplifier input terminals, a standardization motor-driven means for adjusting said contactor of said standardization potentiometer, a balancing motor-driven means for adjusting the contactor of said balancing potentiometer connected to said amplifier output, a second motor-driven cam operated switching means for disconnecting said balancing motor-driven means from said amplifier output and connecting said amplifier output to said standardization motor driven means in response to the energization of said solenoid operated standard stream valves by said first motor-driven cam operated switching means, and a switching means for disconnecting said balancing potentiometer contactor from said other amplifier input terminal in response to said connecting of the amplifier output to said standardization motor-driven means by said second motor-driven cam operated switching means and coincidentally, therewith, for connecting one of said manually adjustable potentiometers to said other input terminal of said amplifier.

3. In an analyzer, in combination, a pair of radiation detectors, a radiation source arranged to transmit a beam of radiation to said detectors, whereby said detectors produce an electrical output representative of the radiation incident thereon, first valve means arranged to control the passage of a first standard fluid into the path of said radiation, second valve means arranged to pass a second standard fluid into the path of said radiation, and third valve means arranged to pass a sample fluid into the path of said radiation, an impedance bridge circuit incorporating said radiation detectors, servo mechanism connected to an impedance of said network and fed by the output of said impedance network to drive said network to a balanced condition, said network further including a balancing impedance and a pair of standardizing impedances, means responsive to actuation of said first valve means to disconnect one of said standardizing impedances from said bridge circuit and to connect the other standardizing impedance therein, means responsive to the energization of said second valve means to connect said one standardizing impedance in the network and disconnect the other standardizing impedance therefrom, means responsive to said third valve means to connect said servo mechanism to said balancing impedance, and means for actuating said valve means in timed sequence.

References Cited in the file of this patent

UNITED STATES PATENTS

| | | |
|---|---|---|
| 2,579,825 | Hutchins | Dec. 25, 1951 |
| 2,721,942 | Frei et al. | Oct. 25, 1955 |
| 2,792,501 | Barton | May 14, 1957 |